C. M. RODGERS AND A. W. WENGER.
CONTROLLER FOR FISH LURES.
APPLICATION FILED MAY 25, 1921.

1,423,025.  Patented July 18, 1922.

INVENTORS
C. M. Rodgers
A. W. Wenger
BY
ATTORNEYS

UNITED STATES PATENT OFFICE.

CLAUDE M. RODGERS AND ARTHUR W. WENGER, OF WARSAW, INDIANA.

CONTROLLER FOR FISH LURES.

1,423,025.  Specification of Letters Patent.  Patented July 18, 1922.

Application filed May 25, 1921. Serial No. 472,477.

*To all whom it may concern:*

Be it known that we, CLAUDE M. RODGERS and ARTHUR W. WENGER, both citizens of the United States, and both residents of the city of Warsaw, in the county of Kosciusko and State of Indiana, have invented a new and useful Improvement in Controllers for Fish Lures, of which the following is a full, clear, and exact description.

Our invention relates to artificial baits or lures used in fishing, and it consists in the combinations, constructions and arrangements herein described and claimed.

An object or our invention is to provide an attachment for an artificial lure or bait that is adapted to control the movement of the lure when the latter is drawn through the water.

A further object of our invention is to provide a device of the character described that can be adjusted to cause the lure to remain at various depths when drawn through the water A further object of our invention is to provide a device of the character described that is adapted to control the wiggling motions or lateral oscillations of the lure to which the device is attached when the latter is drawn through the water.

A further object of our invention is to provided a device for attaining the objects set forth above that can be attached readily to a bait body of an ordinary construction without any extensive changes, if any, being required in the ordinary construction of the latter.

A further object of our invention is to provide a device of the character described that can be adjusted instantly without the use of any tools to vary the movements of the lure to which the device is attached.

Other objects and advantages will appear in the following specification, and the novel features of the invention will be particularly pointed out in the appended claims.

Our invention is illustrated in the accompanying drawings, forming part of this application, in which—

Figure 1:
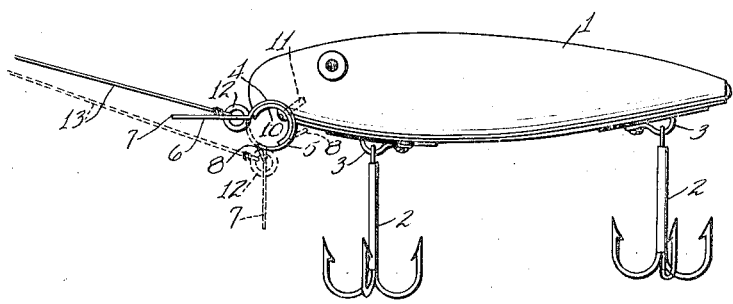
Figure 2:
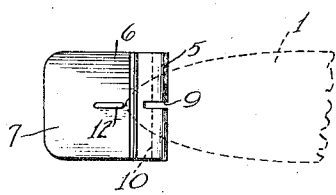
Figure 3:
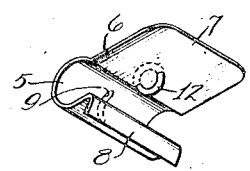

Figure 1 is a side elevation of the device and of a lure to which the device is attached, Figure 2 is a plan view of the device, a portion of the lure being indicated by dotted lines, and Figure 3 is a perspective view of a portion of the device.

In carrying out our invention, we make use of an artificial bait or lure having a body portion 1. In the present instance, the body portion 1 is rigid and is formed in imitation of a minnow. It may be made of any suitable material, such as wood, celluloid, metal, etc., and may have any configuration desired. The body portion 1 is provided with the usual hooks 2 which are secured thereto by eyelet plates 3 or by any other suitable and well known fastening means. The parts described so far are ordinary in construction and form no part of our invention except in so far as they cooperate with the parts about to be described.

A recess 4 is formed in the under side of the body one adjacent to the front end of the latter and this recess is adapted to receive the intermediate substantially semi-cylindrical portion 5 of a movable controlling member that is indicated generally at 6 and has the form best seen in Figure 3. The controlling member 6 is formed of a single piece of metal by preference although other material may be used. A plane portion 7 extends at an angle somewhat greater than a right angle from one end of the intermediate substantially semi-cylindrical portion 5 and a curved lip or flange 8 extends laterally of the other end of the latter at an angle slightly less than a right angle.

The substantially semi-cylindrical intermediate portion 5 is fashioned with a longitudinally extending guide slot 9 intermediate and parallel its sides. A semi-cylindrical clamp 10 fitting within the semi-cylindrical portion 5 is attached to the body 1 by an adjusting screw 11 projected through the slot 9 and frictionally engages the semi-cylindrical portion 5 to hold the latter against the wall of the recess 4 and in adjusted position relative to the body 1. The tension of the semi-cylindrical portion 5 may be varied by adjusting the screw 11. It is desired that the tension be sufficient to normally hold the controlling member 6 in adjusted position relative to the body 1 while permitting the plane portion 7 to be positioned at any desired angle with respect to the body 1 when the thumb is placed on the lip 8 and a stress placed on the latter. A ring 12 is arranged to intersect the plane portion 7 at right angles at a point adjacent to the juncture of the latter with the semi-cylindrical portion 5 and intermediate the side edges thereof. It will thus be observed that a portion of the ring or loop 12 projects above the upper side of the plane portion 7 and that a line 13 is secured thereto.

From the foregoing description of the various parts of the device, the operation thereof may be readily understood. The depth at which the body 1 will travel when drawn through the water, as in casting or trolling operations, may be varied at will by varying the angular position of the plane portion 7 with respect to the horizontal, and to the body 1 since the latter will be substantially horizontally disposed. When the plane portion 7 is positioned as indicated by the full lines in Figure 1, the body 1 will be drawn at the greatest depth. When the plane portion 7 is positioned as indicated by the dotted lines in Figure 1, the body 1 will travel adjacent to or on the surface of the water. The extent of the lateral oscillations of the body 1 is determined by the position of the controlling member 6 relative to the former. When the controlling member is in the position indicated by the dotted lines in Figure 1, a more pronounced wiggling action will result than when the controlling member is in the position indicated by the full lines in Figure 1. The action of the lure may therefore be varied at will. The banking stress of the water on the semi-cylindrical portion of the device will modify the pressure on the front surface of the plane portion 7 to automatically regulate the action of the lure at different depths and will stabilize the body 1 so as to prevent the revolving of the latter. It will thus be observed that the controlling member 6 serves as a friction hinge member that can be adjusted under pressure to vary the depth at which the body 1 will travel and to coincidently vary the action of the body 1 so far as lateral oscillations or wiggling is concerned. The lip or flange 8 serves not only as a stiffening member to prevent distortion of the controlling member in service but also as a thumb or finger piece that is adapted to be pressed to adjust the angular position of the plane portion 7 with respect to the horizontal.

We claim:

1. In a fishing lure, the combination with a rigid body of depth and oscillation controlling and stabilizing means secured thereto, said means comprising a member formed with a substantially semi-cylindrical intermediate portion having an integral laterally extending plane extension at one end and an integral laterally extending lip at the other end, and frictional members for securing the semi-cylindrical portion to the rigid body adjacent to one end of the latter, whereby the plane extension may be positioned at various angles to the plane tangent to the lower surface of the body.

2. A device of the type described comprising a body portion, a member formed with a substantially semi-cylindrical intermediate portion having an integral laterally extending plane extension at one end and an integral laterally extending lip at the other end, said member having a slot in the cylindrical portion thereof, a semi-cylindrical member disposed in the cylindrical portion of said first named member, and a screw carried by said second named member, projecting through the slot in said first named member, and being embedded in said body portion.

CLAUDE M. RODGERS.
ARTHUR W. WENGER.